J. McNAMARA.
AGRICULTURAL IMPLEMENT.
APPLICATION FILED JULY 30, 1919.
1,364,568.
Patented Jan. 4, 1921.
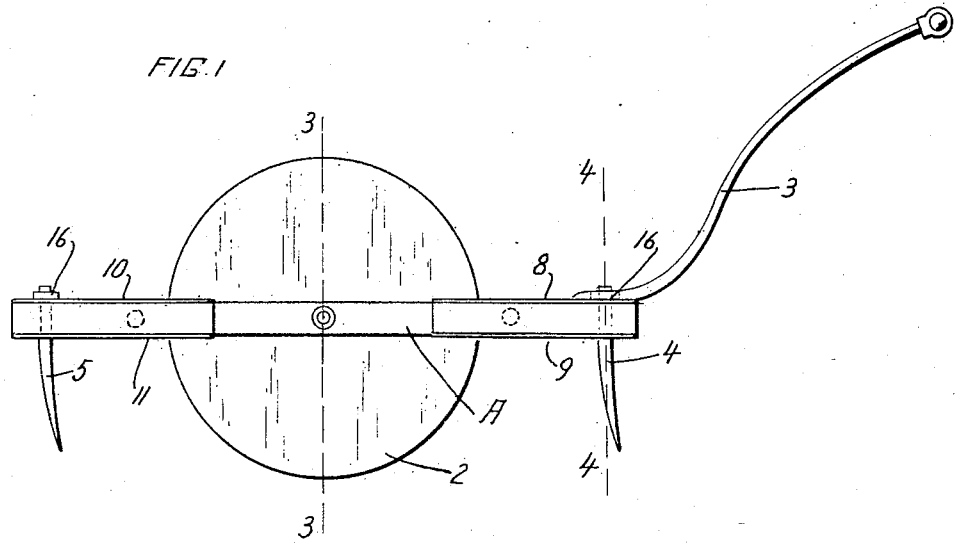
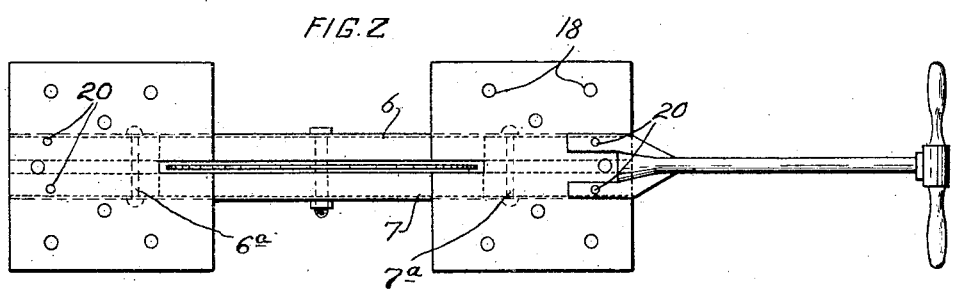
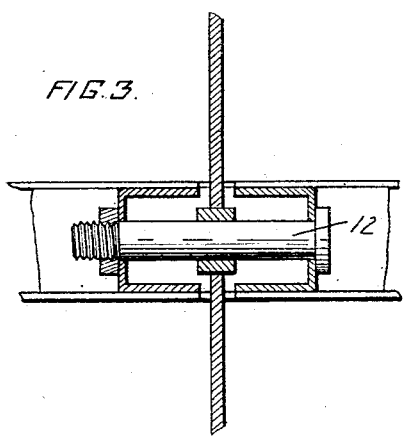
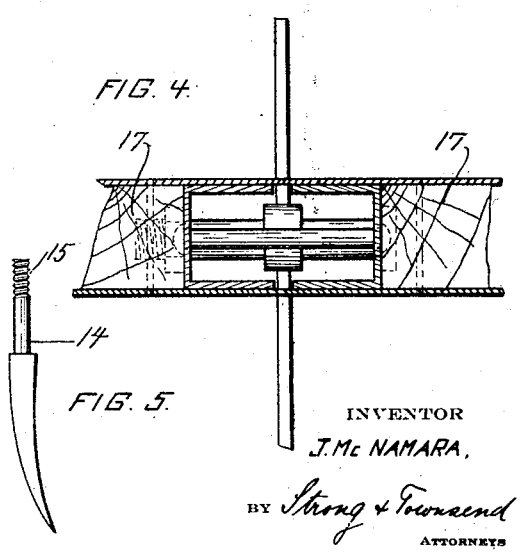
INVENTOR
J. McNAMARA,
BY Strong & Townsend
ATTORNEYS

UNITED STATES PATENT OFFICE.

JOHN McNAMARA, OF MILLBRAE, CALIFORNIA.

AGRICULTURAL IMPLEMENT.

1,364,568.  Specification of Letters Patent.  Patented Jan. 4, 1921.

Application filed July 30, 1919. Serial No. 314,214.

*To all whom it may concern:*

Be it known that I, JOHN McNAMARA, a citizen of the United States, residing at Millbrae, in the county of San Mateo and State of California, have invented new and useful Improvements in Agricultural Implements, of which the following is a specification.

This invention relates to an agricultural implement.

One of the objects of the present invention is to provide a simple, substantial, easily operated agricultural implement adapted for general truck garden work and for other purposes and which is so constructed that implements of varying types may be employed; for instance, weeders, cutters, diggers, harrow teeth, disks, etc., thus providing an implement of general utility.

Another object of the invention is to provide a rigid support for the implements employed and to which they may be readily and quickly attached or removed.

Further objects will hereinafter appear.

The invention consists of the parts and the construction, combination and arrangement of parts as hereinafter more fully described and claimed, having reference to the accompanying drawings, in which—

Figure 1 is a side elevation of the implement.

Fig. 2 is a plan view of the same.

Fig. 3 is an enlarged cross section on line 3—3, Fig. 1.

Fig. 4 is an enlarged cross section on line 4—4, Fig. 1.

Fig. 5 is a detail view of one of the implements employed.

Referring to the drawings in detail, it will be seen that the implement consists of a main frame A, a supporting disk 2, a handle 3, and a pair of digging implements 4 and 5. The main frame consists of a pair of channel bars such as indicated at 6 and 7. These bars are longitudinally disposed, interspaced and maintained in parallelism by means of a pair of spacing blocks and a pair of bolts 6ª and 7ª. The disk 2 is journaled on a bearing pin 12 which extends through, and is secured centrally of, the channel bars 6 and 7 while the digging implements employed are secured between end plates 8, 9, 10 and 11, as indicated in Fig. 1, any equivalent mechanism could be employed since top and bottom plates found in all parts are merely strengthening devices.

Any implement employed should, however be provided with a shank such as shown at 14, see Fig. 5, the upper end of which is threaded as at 15, to permit it to be rigidly secured by means of a nut 16, the shank being sufficiently long to extend through the plates 8 and 9 or 10 and 11, thereby being rigidly braced and supported when in position. The plates 8 and 9 coöperate and similarly the plates 10 and 11. They serve one function; that of a support for the tools or digging implements employed. Spacing blocks or fillers such as shown at 17, may be placed between the end plates 8, 9, 10 and 11, to further insure rigidity and strength and any number of alined holes such as shown at 18, may be formed in the plates for the reception of the digging tools or implements employed. For instance, if harrow teeth are attached to the plates, such as shown in Fig. 1, it is obvious that more than one may be employed if desired, as several alined holes or perforations are formed in the respective plates.

The implement here shown is particularly constructed for a truck garden and other general agricultural work. It has proved exceedingly efficient as a weeder, cultivator, etc., and may be employed to great advantage where the rows or plants are comparatively narrow and closely spaced; that is, the narrow structure of the frame permits the implement to be employed between narrow rows and be moved into any corner desired, thus insuring a perfect working of the ground or removal of weeds when operating. The implement may be pushed or pulled between the rows by means of a handle extension 3 shown or when built comparatively large and employed for other purposes it is obvious that horse or tractor pull may be employed if desired.

While a more or less specific structure is here shown, I wish it understood that various changes in proportions and design may be resorted to within the scope of the appended claims; similarly, that the materials and finish of the several parts employed may be such as the experience and judgment of the manufacturer may dictate or varying conditions may demand.

The plates 8, 9, 10 and 11 may be removed with relation to the channel frame, if desired, as they are only secured thereto by means of bolts 20. It is therefore possible, when changing tools, to remove both or either set of plates and replace the same with plates containing a different character of tools or it may be desirable to remove the plates when changing tools as the same may be more readily handled when removed or replaced. Again, it is obvious that the plates may be removed when certain tools are employed as they may be fastened directly to the channel bars.

Having thus described my invention, what I claim and desire to secure by Letters Patent is—

An agricultural implement including a frame composed of a pair of horizontally interspaced channel bars, rectangular plates fixed in pairs above and below the ends of the channel bars, blocks fixed between said plates and abutting against the channel bars, said plates having alined openings adapted to receive the upper ends of the digging knives, said ends being threaded and nuts for securing the knives in position, a disk journaled in the channel bars midway between the plates and a handle attached to an end of the frame.

In testimony whereof I have hereunto set my hand in the presence of two subscribing witnesses.

JOHN McNAMARA.

Witnesses:
 JOHN H. HERRING,
 W. W. HEALEY.